United States Patent Office 3,479,387
Patented Nov. 18, 1969

3,479,387
PROCESS FOR PREPARING N-METHYL-
GLYCINONITRILE
David A. Daniels, Catonsville, James L. Harper, Laurel, and Thomas R. Steadman, Kensington, Md., assignors to W.R. Grace & Co., New York, N.Y., a corporation of Connecticut
No Drawing. Filed Sept. 26, 1967, Ser. No. 670,749
Int. Cl. C07c 121/42, 99/10
U.S. Cl. 260—465.5                               10 Claims

ABSTRACT OF THE DISCLOSURE

This invention is directed to a process for preparing N-methylglycinonitrile by reacting 1,3,5-trimethylhexahydro-s-triazine with liquid hydrogen cyanide in the presence of an acidic substance selected from the group consisting of sulfuric acid, a toluenesulfonic acid, hydrogen chloride, and sulfonic acid resins, separating, and recovering the N-methylglycinonitrile.

---

This invention is in the field of N-methylglycinonitrile (sarcosinonitrile) preparation.

Prior art methods for preparing sarcosinonitrile are disclosed in U.S. Patents 3,009,954 and 2,720,540.

In summary, this invention is directed to a process for preparing N-methylglycinonitrile, said process comprising: (a) forming N-methylglycinonitrile by; (i) preparing a reaction mixture by adding 1,3,5-trimethylhexahydro-s-triazine to a reaction zone, said reaction zone containing a first mixture consisting essentially of liquid hydrogen cyanide and a strongly acidic material selected from the group consisting of sulfuric acid, a toluenesulfonic acid selected from the group consisting of p-toluenesulfonic acid, o-toluenesulfonic acid, and m-toluenesulfonic acid, hydrogen chloride, and strongly acidic sulfonic acid resins, the equivalent ratio of HCN to the strongly acidic substance in the first mixture being about 1–300:1, said first mixture being maintained within the temperature range of about −5 to 10° C. prior to adding the 1,3,5-trimethylhexahydro - s - triazine thereto, the 1,3,5-trimethylhexahydro-s-triazine being added at the rate of 1 mole per 3–30 moles of hydrogen cyanide present in the reaction zone; and (ii) maintaining the temperature of the thus formed reaction mixture within the range of about 0–25° C. for about 1 to 72 hours; (b) separating and recovering the thus formed N-methylglycinonitrile.

In preferred embodiments of the process set forth in the above summary:

(1) The temperature of the first mixture within the reaction zone is about −2 to 2° C. prior to adding 1,3,5-trimethylhexahydro-s-triazine thereto;

(2) The equivalent ratio of HCN to the strongly acidic substance in the first mixture is about 4–280:1;

(3) The temperature of the reaction mixture is maintained within the range of about −2° to 10° C. for about 3–6 hours;

(4) The N-methylglycinonitrile is separated by distillation under reduced pressure;

(5) The strongly acidic material is hydrogen chloride;

(6) The strongly acidic material is sulfuric acid; and (7) The strongly acidic material is p-toluenesulfonic acid.

In another preferred embodiment this invention is directed to a process for preparing N-methylglycinonitrile from methylamine, formaldehyde, and hydrogen cyanide, the improvement comprising: (a) forming a first aqueous mixture consisting essentially of 1,3,5-trimethylhexahydro-s-triazine and an aqueous mother liquor by mixing methylamine and formaldehyde in an aqueous medium, the mole ratio of water to mtthylamine in said aqueous medium being about 2–5.41, and the mole ratio of methylamine to formaldehyde being about 0.7–1.1:1 while maintaining the temperature of the resulting mixture within the temperature range of about 0–20° C. for about 30–45 minutes; (b) forming a nonaqueous phase, said nonaqueous phase consisting essentially of 1,3,5 - trimethylhexahydro-s-triazine, and an aqueous phase consisting essentially of sodium hydroxide and water, by adding solid (preferably substantially dry) sodium hydroxide to the first aqueous mixture, said sodium hydroxide being added at the rate of about 500–550 grams per kilogram of said first aqueous mixture; (c) separating the nonaqueous phase, said nonaqueous phase consisting essentially of 1,3,5-trimethylhexahydro-s-triazine; (d) forming N-methylglycinonitrile by; (i) preparing a reaction mixture by adding at least a portion of the separated 1,3,5-trimethylhexahydro-s-triazine to a reaction zone, said reaction zone containing a second mixture consisting essentially of liquid hydrogen cyanide and a strongly acidic material selected from the group consisting of sulfuric acid, a toluenesulfonic acid selected from the group consisting of p-toluenesulfonic acid, o-toluenesulfonic acid, and m-toluenesulfonic acid, hydrogen chloride, and strongly acidic sulfonic acid resins, the equivalent ratio of HCN to the strongly acidic substance in the second mixture being about 1–300:1, said second mixture being maintained within the temperature range of about −5 to 10° C. prior to adding the 1,3,5-trimethylhexahydro-s-triazine thereto, the 1,3,5-tirmethylhexahydro-s-triazine being added at the rate of 1 mole per 3–30 moles of hydrogen cyanide present in the reaction zone; and (ii) maintaining the temperature of the thus formed reaction mixture within the range of about 0–25° C. for about 1 to 72 hours; (e) separating and recovering the thus formed N-methylglycinonitrile.

The process of this invention provides a new procedure for preparing sarcosinonitrile, whereby sarcosinonitrile of exceptionally high purity is obtained with a minimum of byproduct formation.

Sarcosinonitrile prepared by the process of this invention has been used with excellent results as an intermediate in the preparation of sodium sarcosinate (by the hydrolysis of sarcosinonitrile with aqueous sodium hydroxide); said sodium sarcosinate has, in turn, been acylated with acyl chlorides of fatty acids having about 8–20 carbon atoms to yield sufactants which have been used with excellent results in shampoos (including rug shampoos) floor waxes, and glass cleaners. The derivative prepared by reacting lauroyl chloride with sodium sarconsinate has been especially useful for such purposes.

The instant invention will be better understood by referring to the following specific but nonlimiting examples. It is understood that said invention is not limited to these examples which are offered merely as illustrations, and it is also understood that modifications can be made without departing from the spirit and scope of the invention.

EXAMPLE I

This example illustrates the preparation of 1,3,5-trimethylhexahydro-s-triazine.

An 89.3 gram (1.1 mole) portion of about a 37% aqueous solution of formaldehyde was placed in a 500 milliliter flask and the temperature of the formaldehyde solution was adjusted to about 0° C. While stirring the formaldehyde solution, a 77 gram (1.0 mole) portion of about a 40% aqueous solution of methylamine was added to the aforesaid formaldehyde solution while keeping the temperature thereof at about 0° C. The thus formed mixture was stirred and maintained at about 0° C. for about 30 minutes. A 55 gram portion of sodium hydroxide pellets was added to the above-described flask while stirring the liquid content thereof and while maintaining the temperature of said liquid at about 10° C. After the sodium hydroxide was all dissolved the resulting alkaline mixture was transferred to a separatory funnel and the lower (aqueous) phase was drained from said funnel leaving a nonaqueous liquid product therein, said product consisting essentially of 1,3,5-trimethylhexahydro-s-triazine. The 1,3,5-trimethylhexahydro-s-triazine was removed from the separatory funnel and stored in a glass stoppered bottle labeled "Product A."

EXAMPLE II

The general procedure of Example I was repeated. However in this instance the procedure was modified by drying the 1,3,5-trimethylhexahydro-s-triazine over barium oxide and then distilling the thus dried 1,3,5-trimethylhexahydro-s-triazine before storing it in a glass stoppered bottle which was labeled "Product B."

EXAMPLE III

Over a period of about 45 minutes, a 12.9 gram (0.1 mole) portion of 1,3,5-trimethylhexahydro-s-triazine made in Example I (Product A) was added to a 500 milliliter flask containing 59 grams (0.31 mole) of p-toluenesulfonic acid and 100 milliliters (2.5 moles) of liquid hydrogen cyanide which had been cooled to about −2° C. with an ice-methanol mixture immediately prior to adding the 1,3,5-trimethylhexahydro-s-triazine. The reaction was only mildly exothermic and the temperature was easily controlled and at no time did it exceed 5° C. The excess HCN was distilled off under vacuum leaving a viscous light brown oil behind. On standing overnight at about 22–25° C. a few crystals formed in the oil. These crystals were removed by filtration. The filtered oil was subjected to gas chromatography and found to be sarcosinonitrile of high quality. The oil weighed 19.8 grams, representing a conversion (one pass yield) of about 95% of theory.

EXAMPLE IV

The general procedure of Example III was repeated. However, in this instance the 1,3,5-trimethylhexahydro-s-triazine used was that made in Example II and labeled Product B. Aside from this change, the procedure in the instant example was identical to that of Example III. The results obtained were indistinguishable from those of Example III.

EXAMPLE V

A 12.9 gram (0.1 mole) portion of the 1,3,5-trimethylhexahydro-s-triazine which was prepared in Example I, supra, and labeled Product A, was added to a 500 milliliter flask, said flask containing 100 milliliters of toluene and 40 milliliters (1 mole) of HCN, and 59 grams (0.31 mole) of p-toluenesulfonic acid while stirring the contents of the flask. The flask and its contents had been cooled to about 0° C. in an ice-methanol bath prior to adding Product A. The reaction was very slightly exothermic and the color of the material in the flask turned a light brown. The excess HCN and the toluene were distilled off under vacuum leaving a viscous oil. Upon standing at about 18 hours at about 25° C. a small quantity of crystals precipitated from the oil. These crystals were separated by centrifugation, and the recovered oil was weighed. A sample of the oil was subjected to gas chromatographic analysis. The results of this analysis established that the oil was substantially pure sarcosinonitrile. The conversion based upon the weight (19.4 grams) of the recovered oil was about 94% theory.

EXAMPLE VI

A 22.5 gram (0.169 mole) portion of Product B, prepared in Example II, supra, was added to a 500 milliliter flask which contained 150 milliliters (a substantial excess) of HCN which had been acidified with six drops of concentrated sulfuric acid and which had been cooled in an ice bath before adding the Product B. The material in the flask was stirred while adding Product B. The reaction was slightly exothermic, but the temperature was kept below 10° C. during the addition of said Product B. The resulting mixture was allowed to stand for about 65 hours during which time it gradually warmed to room temperature. At the end of the 65 hour period a quantity of black viscous material was present in the flask. The mixture was dissolved in acetone and the resulting solution was passed through an aluminum column. The acetone was stripped off the material which had passed through the column and the resulting dark liquid was distilled. A water white fraction boiling at 26° C. at 2.5 millimeters of mercury absolute pressure was collected and retained. This material was a clear colorless oil weighing 12.3 grams. It was established, by infrared analysis and by NMR (nuclear magnetic resonance) that this colorless oil was substantially pure sarcosinonitrile. The conversion in this run was about 33% of theory.

EXAMPLE VII

The general procedure of Example II was repeated. However, in this instance, the quantities of reactants used were doubled those used in Example II. The results were identical to those obtained in Example II except that the yield (expressed in grams) of 1,3,5-trimethylhexahydro-s-triazine was doubled that obtained in Example II. This product was labeled "Product C" and stored in a glass stoppered bottle.

EXAMPLE VIII

The general procedure of Example IV was repeated. However, in this instance the p-toluenesulfonic acid of Example IV was replaced with 10 milliliters of concentrated hydrochloric acid. The results obtained in this example were substantially identical to those obtained in Example IV, supra.

EXAMPLE IX

The general procedure of Example IV was repeated. However in this instance the p-toluenesulfonic acid was replaced with 11 grams of anhydrous HCl. The results obtained in this run were substantially identical to those obtained in Example IV.

EXAMPLE X

About a 2 mole portion of 1,3,5-trimethylhexahydro-s-triazine was prepared by the general method of Example II; however, in this instance the 1,3,5-trimethylhexahydro-s-triazine was dried over barium oxide but not distilled. The thus dried 1,3,5-trimethylhexahydro-s-triazine was stored in a glass stoppered bottle which was labeled "Product D."

EXAMPLE XI

A 133 gram (1.03 mole) portion of 1,3,5-trimethylhexahydro-s-triazine made in Example X (Product D) was added dropwise from a dropping funnel into a one liter flask, said flask containing 250 milliliters (6.25 moles) of HCN and 25 grams of Amberlyst-15 (an anhydrous sulfonic acid resin having a hydrogen ion concentration of about 5 equivalents per kilogram), the temperature of the HCN-resin mixture being about −2° C. The mixture in the flask was stirred while adding the 1,3,5-trimethylhexahydro-s-triazine thereto. The temperature of the material in the flask was kept below about 20° C. during the addition of the 1,3,5-trimethylhexahydro-s-triazine, said addition requiring about an hour.

After adding the 1,3,5-trimethylhexahydro-s-triazine, the mixture within the flask was kept at about 15–20° C. for 3 hours; then the excess HCN was stripped off under vacuum and the residue was distilled. The portion boiling at about 31–33° C. at a pressure of about 1.5 millimeters of mercury absolute was collected, recovered, and weighed. The recovered material, weighing 166 grams, was identified as substantially pure sarcosinonitrile. Conversion was 79% theory.

We have obtained excellent results where preparing 1,3,5 - trimethylhexahydro-s-triazine using anhydrous methylamine. Conversions were at least as good as those obtained where using aqueous solutions of methylamine, and the quality of the product was at least as good as that obtained where using aqueous solutions of methylamine.

As used herein, the term "percent" (percent), unless otherwise defined where used, means parts per hundred by weight, and the term "parts," unless otherwise defined where used, means parts by weight.

As used herein, the term "strongly acidic material" means an acid or sulfonic acid resin having an ionization constant about equal to or greater than the ionization constant of p-, or o-, or m-toluenesulfonic acid and greater than $1 \times 10^{-5}$.

An "equivalent" of HCN means one mole of HCN, an "equivalent" of HCl means one mole of HCl, an "equivalent" of o-, m-, or p-toluenesulfonic acid means one mole of such acid, and an "equivalent" of $H_2SO_4$ means 0.5 mole of $H_2SO_4$ because the equivalent weight of HCN is (for the purpose of this specification) identical with its molecular weight and the equivalent weight of a strongly acidic material is the quantity of such acidic material that contains or will release one mole of hydrogen ion. Thus, one equivalent of a monobasic (monoprotic) strongly acidic material is one mole of said monobasic material, one equivalent of a dibasic strongly acidic material is 0.5 mole of a said dibasic material, and one mole of a hexabasic strongly acidic material would be ⅙ of a mole of said hexabasic material.

We claim:
1. A process for preparing N-methylglycinonitrile, said process comprising:
   (a) forming N-methylglycinonitrile by: (i) preparing a reaction mixture by adding 1,3,5-trimethylhexahydro-s-triazine to a reaction zone containing a first mixture consisting essentially of liquid hydrogen cyanide and a strongly acidic material selected from the group consisting of sulfuric acid, a toluenesulfonic acid selected from the group consisting of p-toluenesulfonic acid, o-toluenesulfonic acid, and m-toluenesulfonic acid, hydrogen chloride, and strongly acidic sulfonic acid resins, the mole ratio of HCN to strongly acidic material in the first mixture being about 1–300:1, said first mixture being maintained within the temperature range of about −5 to 10° C. prior to adding the 1,3,5-trimethylhexahydro-s-triazine thereto, the 1,3,5-trimethylhexahydro-s-triazine being added at the rate of 1 mole per 3–30 moles of hydrogen cyanide present in the reaction zone; and (ii) maintaining the temperature of the thus formed reaction mixture within the range of about 0–25° C. for about 1 to 72 hours;
   (b) separating and recovering the thus formed N-methylglycinonitrile.

2. The process of claim 1 in which the temperature of the first mixture within the reaction zone is about −2 to 2° C. prior to adding 1,3,5-trimethylhexahydro-s-triazine thereto.

3. The process of claim 1 in which the equivalent ratio of HCN to strongly acid material in the first mixture is about 4–280:1.

4. The process of claim 1 in which the temperature of the reaction mixture is maintained within the range of about −2 to 10° C. for about 3–6 hours.

5. The process of claim 1 in which the N-methylglycinonitrile is separated by distillation under reduced pressure.

6. The process of claim 1 in which the strongly acidic material is hydrogen chloride.

7. The process of claim 1 in which the strongly acidic material is sulfuric acid.

8. The process of claim 1 in which the acid material is p-toluenesulfonic acid.

9. The process of claim 1 in which the strongly acidic material is a strongly acidic sulfonic acid resin.

10. In the process for preparing N-methylglycinonitrile from methylamine, formaldehyde, and hydrogen cyanide, the improvement comprising:
   (a) forming a first aqueous mixture consisting essentially of 1,3,5-trimethylhexahydro-s-triazine and an aqueous mother liquor by mixing methylamine and formaldehyde in an aqueous medium, the mole ratio of water to methylamine in said aqueous medium being about 2–5.4:1, and the mole ratio of methylamine to formaldehyde being about 0.7–1.1:1 while maintaining the temperature of the resulting mixture within the range of about 0–20° C. for about 30–45 minutes;
   (b) forming a nonaqueous phase, said nonaqueous phase consisting essentially of 1,3,5-trimethylhexahydro-s-triazine, and an aqueous phase consisting essentially of sodium hydroxide and water, by adding solid sodium hydroxide to the first aqueous mixture, said sodium hydroxide being added at the rate of about 500–550 grams per kilogram of said first aqueous mixture;
   (c) separating the nonaqueous phase, said nonaqueous phase consisting essentially of 1,3,5-trimethylhexahydro-s-triazine;
   (d) forming N-methylglycinonitrile by; (i) preparing a reaction mixture by adding at least a portion of the separated 1,3,5-trimethylhexahydro-s-triazine to a reaction zone, said reaction zone containing a second mixture consisting essentially of liquid hydrogen cyanide and a strongly acidic material selected from the group consisting of sulfuric acid, a toluenesulfonic acid selected from the group consisting of p-toluenesulfonic acid, o-toluenesulfonic acid, and m-toluenesulfonic acid, hydrogen chloride, and strongly acidic sulfonic acid resins, the equivalent ratio of HCN to the strongly acidic material in the second mixture being about 1–300:1, said second mixture being maintained within the temperature range of about −5 to 10° C. prior to adding the 1,3,5-trimethylhexahydro-s-triazine thereto, the 1,3,5-trimethylhexahydro-s-triazine being added at the rate of 1 mole per 3–30 moles of hydrogen cyanide present in the reaction zone; and (ii) maintaining the temperature of the thus formed reaction mixture within the range of about 0–20° C. for about 1 to 72 hours;
   (e) separating and recovering the N-methylglycinonitrile.

References Cited
UNITED STATES PATENTS 2,720,540    10/1955    Caverly _____ 260—465.5 XR JOSEPH P. BRUST, Primary Examiner U.S. Cl. X.R.
260—404, 534